(12) United States Patent
Fukui et al.

(10) Patent No.: US 6,568,883 B1
(45) Date of Patent: May 27, 2003

(54) METHOD OF FINISHING INNER CIRCUMFERENTIAL SURFACE, AND REAMER

(75) Inventors: Akio Fukui, Toyohashi (JP); Atsushi Iwahori, Chiryu (JP); Tetsuro Nakanose, Nagoya (JP); Kunitoshi Miyazaki, Toyota (JP); Motoshi Nakamura, Toyota (JP)

(73) Assignees: Fuji Seiko Limited, Toyota (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/647,740

(22) PCT Filed: Apr. 9, 1999

(86) PCT No.: PCT/JP99/01923

§ 371 (c)(1),
(2), (4) Date: Oct. 4, 2000

(87) PCT Pub. No.: WO99/52665

PCT Pub. Date: Oct. 21, 1999

(30) Foreign Application Priority Data

Apr. 14, 1998 (JP) ............................................ 10-103037

(51) Int. Cl.$^7$ ............................................. B23B 51/02
(52) U.S. Cl. ..................... 408/229; 76/108.1; 408/1 R; 408/181; 408/239 R
(58) Field of Search ........................ 76/108.6, 108.1, 76/115; 408/146, 153, 181, 185, 186, 231, 233, 239 R, 144, 1 R, 199, 83, 229, 227, 708, 54

(56) References Cited

U.S. PATENT DOCUMENTS

| | | | | |
|---|---|---|---|---|
| 1,514,704 A | * | 11/1924 | Jack ........................ | 144/114.1 |
| 4,218,068 A | * | 8/1980 | Lutz et al. .................. | 279/133 |
| 4,666,353 A | * | 5/1987 | Micec ........................ | 279/158 |
| 4,776,734 A | * | 10/1988 | Buettiker et al. .............. | 279/6 |
| 5,221,165 A | * | 6/1993 | Goszczynski ............... | 408/1 R |
| 5,238,335 A | * | 8/1993 | Nomura ..................... | 408/199 |
| 5,427,484 A | * | 6/1995 | Galli ......................... | 279/133 |
| 5,795,111 A | * | 8/1998 | Kress et al. ................ | 408/199 |
| 5,971,682 A | * | 10/1999 | Vig .............................. | 279/6 |
| 6,206,617 B1 | * | 3/2001 | Kawazoe et al. .......... | 408/1 R |

FOREIGN PATENT DOCUMENTS

| JP | 8-155735 | 6/1996 |
|---|---|---|
| JP | 3042863 | 8/1997 |

* cited by examiner

Primary Examiner—Daniel W. Howell
(74) Attorney, Agent, or Firm—Oliff & Berridge, PLC

(57) ABSTRACT

A reamer includes: (a) an axially-distal-end small-diameter portion; (b) a guide portion which is axially adjacent to the small-diameter portion; (c) at least one flute which is formed in an outer circumferential surface of the reamer and which extends from the axially distal end of the reamer toward the axially distal end of the reamer; and (d) at least one land surface which is circumferentially adjacent to the flute. The land has a cutting blade portion formed therein in the axially-distal-end small-diameter portion. A first radial distance from an axis of the reamer to a radically outer end of the cutting blade portion is larger than a second radial distance from the axis to the land surface in the axially-distal-end small-diameter portion. The first radial distance is smaller than a third radial distance from the axis to the land surface in the guide portion.

16 Claims, 11 Drawing Sheets

METHOD OF FINISHING INNER CIRCUMFERENTIAL SURFACE, AND REAMER

TECHNICAL FIELD

The present invention relates in general to a method of finishing inner circumferential surfaces of a plurality of holes, which are arranged along a line and spaced apart from each other in the axial direction of the holes, and a reamer suitable for the same method.

BACKGROUND ART

There is a demand for finishing inner circumferential surfaces of a plurality of holes, such as camshaft holes of an engine, which are arranged along a line and axially spaced apart from each other, with a high degree of concentricity between the holes and a high degree of dimensional accuracy of each hole. To satisfy such a demand, there has been conventionally employed a single-blade reamer having a cutting tip fixedly attached to the tool body, or a cutting tip slidably attached to the tool body such that the position of the cutting tip relative to the tool body is finely adjustable by an adjusting mechanism which is built in the tool body. It is preferable that the single-blade reamer has a plurality of land surfaces formed in an outer circumferential surface thereof and axially extending from a distal end thereof toward a proximal end thereof, and that the cutting tip having major and minor cutting edges is positioned in one of the land surfaces. Further, it is desirable that the cutting tip is constituted by a sintered-compact cutting tip or other cutting tip which has a hardness higher than that of cemented carbide.

However, where the demand is very severe, namely, where the required degrees of concentricity and dimensional accuracy are considerably high, it is not easy to satisfy such a severe demand even by using the above-described reamer.

DISCLOSURE OF INVENTION

The present invention was made under this situation, and the object of the invention is therefore to provide a method of finishing inner circumferential surfaces of a plurality of holes which are arranged along a line and spaced apart from each other in the axial direction of the holes, and a reamer suitable for practicing the same method, which assure a required degree of concentricity between the holes and a required degree of dimensional accuracy of each hole even where the required degrees of concentricity and dimensional accuracy are considerably high.

The present invention provides an inner-circumferential-surface finishing method or a reamer according to each of the following modes of the invention, which are numbered and dependent from each other like the appended claims, where appropriate. It is to be understood that the following modes are provided to facilitate the understanding of possible combinations of features recited in the following modes, and that the technical features and the combinations of the technical features disclosed in the present specification are not limited to the following modes.

(1) A method of finishing inner circumferential surfaces of a plurality of holes which are arranged along a line and spaced apart from each other in an axial direction of the plurality of holes by using a reamer, the method being characterized in that:

the reamer comprises at least one land surface which is formed in an outer circumferential surface of the reamer and which extends from an axially distal end of the reamer toward an axially proximal end of the reamer, an axially-distal-end small-diameter portion which extends over a predetermined axial distance from the axially distal end toward the axially proximal end, a guide portion which is axially adjacent to the axially-distal-end small-diameter portion, and major and minor cutting edges which are formed in at least one of the at least one land surface in the axially-distal-end small-diameter portion, the at least one land surface having a turning radius which is smaller in the axially-distal-end small-diameter portion than in the guide portion, the minor cutting edge having a turning radius which is larger than the turning radius of the at least one land surface in the axially-distal-end small-diameter portion and which is smaller than the turning radius of the at least one land surface in the guide portion;

and wherein the plurality of holes are finished in order of the arrangement of the plurality of holes in the line, such that an inner circumferential surface of an outermost one of the plurality of holes is first finished by the major and minor cutting edges of the reamer, and such that an inner circumferential surface of each of the other of the plurality of holes is then finished by the major and minor cutting edges, with the guide portion being fitted in at least one of the plurality of holes whose inner circumferential surface has been finished by the major and minor cutting edges.

The major and minor cutting edges may be formed integrally with the land surface, or alternatively may be formed in a cutting tip which is removably fixed to the reamer. Further, the reamer may have an adjusting mechanism built therein which permits fine adjustment of position of the cutting tip (turning radius of the minor cutting edge).

In the finishing operation to the holes positioned in a line and axially-spaced apart from each other by the present method, a first one of the holes is machined as in a case where a hole is machined by an ordinary reamer, and then a second one of the holes is machined with the guide portion being interference-fitted or transition-fitted in the first hole which has been machined. Thus, while the second hole is machined, the guide portion of the reamer is guided by the first hole and is accordingly substantially unmovable in the radial direction. Since the second hole is machined by the major or minor cutting edge which is comparatively near from the guide portion accurately guided by the first hole, a sufficiently high degree of concentricity of the second hole with respect to the first hole and a sufficiently high degree of dimensional accuracy of the second hole are assured. In a process of manufacturing the reamer, if the major and minor cutting edges are formed integrally with the guide portion in a single step, it is possible to easily establish a minute difference between the turning radius of the land surface in the guide portion and the turning radius of the minor cutting edge. This eliminates a necessity of the fine adjustment of position of the cutting tip by the above-described adjusting mechanism which adjustment is not so easy for an ordinary operator and requires a skilled operator to be achieved.

The turning radius of the land surface in the axially-distal-end small-diameter portion and that in the guide portion may be determined such that the second and later holes are machined with the guide portion being interference- or transition-fitted in the hole or holes which has been machined, for assuring considerably high degrees of concentricity and machining accuracy. However, it is not essential that the guide portion is interference-fitted in the machined holes. That is, as long as the turning radius of the minor cutting edge is smaller than the turning radius of the land surface in the guide portion, the concentricity and machining accuracy can be improved as compared with the prior art.

(2) A method according to claim 1, wherein the number of the plurality of holes is at least three, and an inner circumferential surface of at least one of the plurality of holes is finished by the major and minor cutting edges, with the guide portion being fitted in at least two of the plurality of holes whose inner circumferential surfaces have been finished by the major and minor cutting edges.

Where the number of the holes to be machined is at least three, the first and second holes are machined as described above, and a third hole is then machined with the guide portion of the reamer being fitted in the first and second holes which have been machined. The third hole is thus machined while the guide portion is guided by the two points which are spaced apart from each other in the axial direction, thereby assuring a high degree of concentricity between the three holes. A fourth and later holes are also machined while the guide portion of the reamer is fitted in the holes which have been machined.

(3) A reamer comprising:
at least one land surface which is formed in an outer circumferential surface of the reamer and which extends from an axially distal end of the reamer toward an axially proximal end of the reamer;
an axially-distal-end small-diameter portion which extends over a predetermined axial distance from the axially distal end toward the axially proximal end;
a guide portion which is axially adjacent to the axially-distal-end small-diameter portion; and
major and minor cutting edges which are formed in at least one of the at least one land surface in the axially-distal-end small-diameter portion;
and wherein the at least one land surface has a turning radius which is smaller in the axially-distal-end small-diameter portion than in the guide portion, while the minor cutting edge has a turning radius which is larger than the turning radius of the at least one land surface in the axially-distal-end small-diameter portion and which is smaller than the turning radius of the at least one land surface in the guide portion.

The reamer according to the present mode (3) is suitable for practicing the inner-circumferential-surface finishing method defined above in mode (1).

(4) A reamer according to mode (3), wherein a difference between the turning radius of the at least one land surface in the guide portion and the turning radius of the minor cutting edge is not larger than 30 μm.

The above-described difference should be larger as the turning radius of the minor cutting edge increases. However, in general, this difference is preferably not larger than 20 μm, and more preferably not larger than 10 μm.

(5) A reamer according to mode (3) or (4), wherein the major and minor cutting edges are constituted by a cutting tip which is fixed to an axially distal end of the axially-distal-end small-diameter portion, the cutting tip being formed of a sintered body having a hardness higher than that of cemented carbide.

In the reamer of this mode (5) in which the major and minor cutting edges are constituted by the cutting tip having a high hardness, the cutting sharpness or performance of the reamer is improved, thereby providing a further improved surface smoothness of the machined inner circumferential surface of the hole and a further improved dimensional accuracy of the hole. Moreover, the improved cutting performance leads to an improvement in the durability of the major and minor cutting edges and an accordingly prolonged life of the reamer. Where the major cutting edge is worn off, the cutting tip is, in general, re-ground at its distal, so as to be then used again. When the length of the cutting tip is reduced to a predetermined length as a result of repeated re-grindings, the cutting tip is discarded. The cutting tip may include a diamond coating which is formed by sintering an artificial diamond at an ultra-high temperature and an ultra-high pressure, and a cemented carbide substrate which is covered by the diamond coating. Or alternatively, the cutting tip may include a CBN (cubic boron nitrides) sintered compact which is formed by bonding cubic boron nitrides to each other at an ultra-high temperature and an ultra-high pressure, and a cemented carbide substrate which is covered by the CBN sintered compact.

(6) A reamer according to any one of modes (3)–(5), wherein at least one of the minor cutting edge and the guide portion is back-tapered, and wherein the turning radius of the minor cutting edge represents a maximum turning radius of the minor cutting edge, while the turning radius of the at least one land surface in the guide portion represents a maximum turning radius of the at least one land surface in the guide portion.

It is not essential but preferable that the minor cutting edge is back-tapered such that the turning radius of the minor cutting edge decreases as the minor cutting edge extends from the axially distal end of the reamer toward the axially proximal end of the reamer. It might not be preferable that the guide portion is not back-tapered, in view of a guiding performance of the guide portion of the reamer. However, the guide portion may be slightly tapered, in order to avoid an increase in the diameter of the guide portion in the direction away from the axially distal end toward the axially proximal end. Where the minor cutting edge and the guide portion are both back-tapered, the difference defined in the mode (4) represents a difference between the maximum turning radius of the minor cutting edge and that of the land surface in the guide portion, namely, between the turning radius of the minor cutting edge at its distal end and that of the land surface at the axial end of the guide portion which end is nearest to the axially distal end of the reamer.

(7) A reamer according to any one of modes (3)–(6), wherein the at least one land surface includes a plurality of land surfaces, and wherein an angular interval between each circumferentially adjacent two of the plurality of land surfaces in a first region is smaller than that in a second region, the first region corresponding to one of opposite sides of a plane containing an axis of the reamer and an intersection of the major and minor cutting edges on which side one of the plurality of land surfaces having major and minor cutting edges formed therein is located, the second region corresponding to the other side of the plane.

When the reamer is in the process of cutting an inner circumferential surface of a hole by the major and minor cutting edges, the land surfaces are supported by the inner circumferential surface of the hole, thereby preventing the reamer from being deflected due to a cutting resistance acting on the major and minor cutting edges. Since the cutting resistance tends to be increased and decreased, it is preferable to prevent the reamer from being deflected not only in a cutting-resistance-acting direction in which the reamer is forced to be deflected by the cutting resistance but also in a direction opposite to the cutting-resistance-acting direction. In this view, the land surfaces are preferably provided both in the first and second regions. Further, the provision of the land surfaces in both of the first and second regions is preferable, also for easier definition of the position of the axis of the reamer. However, it is not preferable that the number of the land surfaces increases, in view that a frictional resistance acting on the land surfaces increases as the number of the land surfaces increases. Therefore, it is preferable to increase the total circumferential area of the land surfaces in the first region on which the cutting resistance principally acts and to decrease that of the land surfaces in the second region.

(8) A reamer according to any one of modes (3)–(7), wherein one of the plurality of land surfaces is diametrically opposed to one of the plurality of land surfaces which has major and minor cutting edges formed therein.

(9) A reamer according to mode (8), wherein two of the plurality of land surfaces are located in the first region in addition to the one which has major and minor cutting edge formed therein, while one of the plurality of land surfaces is located in the second region in addition to the one diametrically opposed to the which has major and minor cutting edge formed therein.

(10) A reamer according to any one of modes (3)–(6), wherein the number of the at least one land surface is one.

(11) A reamer according to any one of modes (3)–(10), wherein the at least one land surface extends straight in parallel with an axis of the reamer.

(12) A reamer according to any one of modes (3)–(10), wherein the at least one land surface is a spiral land surface which is twisted around an axis of the reamer.

(13) A reamer assembly comprising:

the reamer recited in any one of modes (3)–(12); and a reamer holder which holds the axially proximal end of the reamer, and which is to be mounted in a spindle of a machine tool.

The reamer has to be equally positioned relative to the spindle, each time the reamer is newly installed in the spindle of a machine tool. To this end, the reamer has to have at its axially proximal end a high-precision holding portion which permits the reamer to be removably attached at the holding portion to the spindle with a high repeatability of the positional relationship between the reamer and the spindle. Where the holding portion is constituted by the reamer holder which is separable from the reamer, the reamer holder can be used as a holder commonly for a plurality of different reamers, thereby making it possible to reduce the tooling cost.

(14) A reamer assembly according to mode (13), further comprising an alignment mechanism which is provided between the reamer and the reamer holder, and which decreases at least one of a radial deviation of an axis of the reamer from an axis of the reamer holder and an inclination of the axis of the reamer with respect to the axis of the reamer holder.

Where the reamer is separable from the reamer holder, it is preferable that the position of the reamer relative to the reamer holder is adjustable upon attachment of the reamer to the reamer holder. The reamer and the reamer holder may have, for example, a fitting boss and a fitting hole formed in the respective end faces, such that the reamer and the reamer holder are connected with each other by engagement between the fitting boss and the fitting hole, thereby positioning the axis of the reamer and that of the reamer holder relative to each other. However, a required degree of coaxial relationship between the reamer and the reamer holder and a required degree of machining accuracy are not necessarily assured by only the engagement of the fitting boss and hole, particularly when theses required degrees are considerably high.

(15) A reamer assembly according to mode (14), wherein the reamer further includes a flange which is attached to the axially proximal end of the reamer and projects radially outwardly from the axially proximal end of the reamer, and at least three axially adjusting screws and at least three screw bolts which are provided in the flange and which constitute the alignment mechanism for decreasing the inclination of the axis of the reamer with respect to the axis of the reamer holder, the axially adjusting screws being arranged about the axis and equi-angularly spaced apart from each other in a circumferential direction of the reamer so as to be abuttable on an end face of the reamer holder, each of the screw bolts being positioned between circumferentially adjacent two of the axially adjusting screws.

(16) A reamer assembly according to any one of modes (13)–(15), wherein the reamer has a fitting boss while the reamer holder has a fitting hole so that the reamer and the reamer holder are connected with each other by axial engagement between the fitting boss and the fitting hole, and wherein the reamer holder includes at least three radially adjusting screws which are provided in a circumferential wall of the reamer holder circumferentially defining the fitting hole and which constitute the alignment mechanism for decreasing the radial deviation of the axis of the reamer from the axis of the reamer holder, the at least three radially adjusting screws being equi-angularly spaced apart from each other in a circumferential direction of the reamer holder, so as to be abuttable on an outer circumferential surface of the fitting boss.

BEST MODE FOR CARRYING OUT THE INVENTION

One embodiment of the present invention will be explained in detail on the basis of the drawings.

Figure 1:
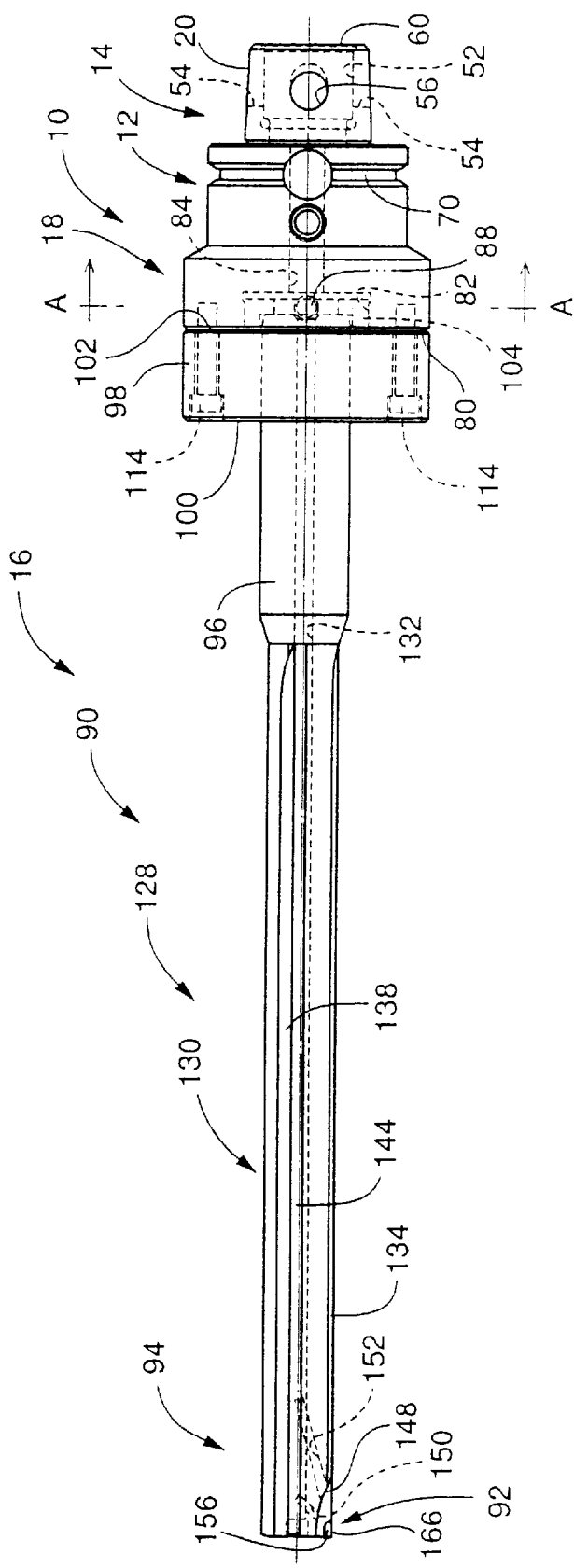
FIG. 1 is a front elevational view of a reamer according to one embodiment of the present invention, and a reamer holder which holds the reamer.
Figure 3:
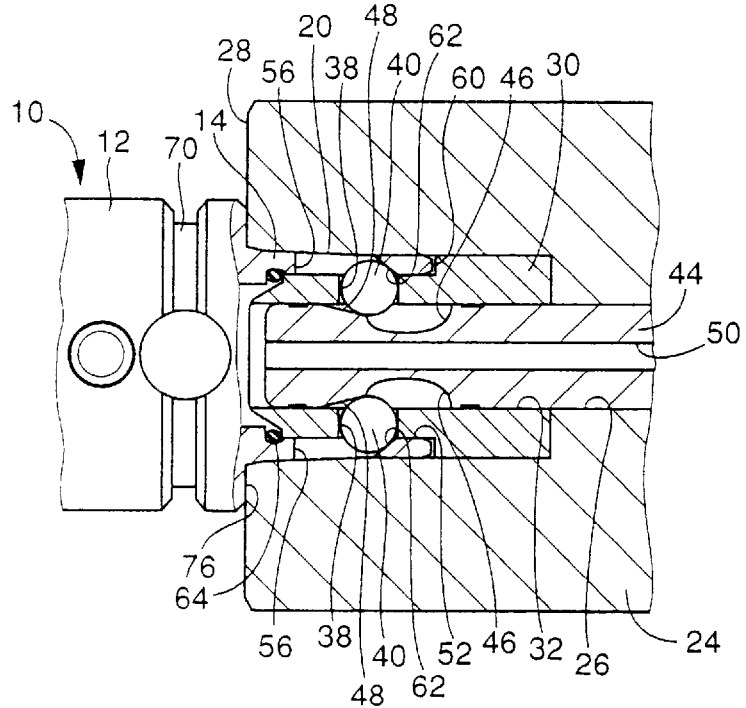
FIG. 3 is a front view (partially in cross section) showing the above-described reamer holder as installed in a spindle.

In FIG. 1, the reference numeral 10 designates a reamer holder having a generally stepped cylindrical shape. The reamer holder 10 has a body portion 12 located in its intermediate portion, a fitting portion 14 having a small diameter and located in its rear end portion (in its right side end as seen in FIG. 1), and a holding portion 18 serving to hold a reamer 16 and located in its front end portion (in its left side end as seen in FIG. 1). The fitting portion 14 has a tapered outer circumferential surface 20, and has a diameter which reduces in a direction away from its front end toward its rear end. The reamer holder 10 is attachable at the fitting portion 14 to a spindle 24, as shown in FIG. 3, of a machine tool. The spindle 24 is rotatably held by a spindle head (not shown) of the machine tool. The spindle head is movable in an axial direction of the spindle 24 by a feed mechanism (not shown) of the machine tool.

The spindle 24 has a spindle hole 26 formed therethrough. The spindle hole 26 has a coaxial relationship with a rotational axis of the spindle 24, and has a large diameter portion and a small diameter portion. The spindle hole 26 is open, at its large diameter portion, in an end face 28 of the spindle 24. The spindle hole 26 has, near the opening in the large diameter portion, a tapered inner circumferential surface corresponding to the tapered outer circumferential surface 20 of the fitting portion 14 of the reamer holder 10. Into the large diameter portion of the spindle hole 26, a stepped-cylindrical-shaped fitting member 30 is fitted such that the fitting member 30 is unmovable relative to the spindle hole 26. The fitting member 30 has a through-hole 32 formed therethrough and having a diameter equal to that of the small diameter portion of the spindle hole 26. The fitting member 30 has a large diameter portion which is fitted in the spindle hole 26, and a small diameter portion which extends toward the opening of the spindle hole 26. The fitting member 30 has in the small diameter portion a pair of radially-extending holes 38 formed through its cylindrical wall and communicating with the through-hole 32. In each of the pair of radially-extending holes 38, there is accommodated a ball 40. The ball 40 is held in the radially-extending hole 38, such that the ball 40 is movable in the radial direction of the fitting member 30 but substantially unmovable in the axial direction of the fitting member 30.

The spindle 24 has a clamp rod 44 which is inserted in the spindle hole 26 and which is movable in the axial direction by a rod driving device (not shown) built in the spindle 24. The clamp rod 44 is fitted at its distal end portion in the through-hole 32 of the fitting member 30. The clamp rod 44 has a pair of ball-accommodating recesses 46 formed in the outer circumferential surface of the distal end portion, and a pair of sloped surfaces 48 which extend in the axial direction from the respective ball-accommodating recesses 46 toward the distal end of the clamp rod 44. Each of the sloped surface 48 is inclined with respect to the axis of the clamp rod 44 such that a distance from the axis to the sloped surface 48 increases in a direction from the ball-accommodating recess 46 toward the distal end of the clamp rod 44. The ball-accommodating recess 46 and the sloped surface 48 have a semicircular shape and an arcuate shape, respectively, as viewed in a longitudinal cross section of the spindle 24, so that a large portion of the spherical surface of the ball 40 is brought into contact with the ball-accommodating recess 46 or the sloped surface 48. It is noted that the clamp rod 44 further has a coolant hole 50 formed therethrough at its center.

The reamer holder 10 has an axial hole 52, a pair of engaging cutouts 54 and a pair of radial through-holes 56 in the fitting portion 14, as shown in FIG. 1. The pair of engaging cutouts 54 are positioned diametrically opposed to each other and elongated in the axial direction. The pair of radial through-holes 56 are formed through the circumferential wall of the fitting portion 14, and extend radially from the outer circumferential surface of the fitting portion 14 to open in the axial hole 52. The pair of radial through-holes 56 are also positioned diametrically opposed to each other, and each of the radial through-holes 56 is spaced from the engaging cutouts 54 by 90° in the circumferential direction. Each of the radial through-holes 56 has a circle shape in its opening in the outer circumferential surface of the fitting portion 14, and an elliptic shape in its opening in the inner circumferential surface of the fitting portion 14. The elliptic shape is elongated in the axial direction of the reamer holder 10. That is, a diameter of the radial through-hole 56 as measured in the axial direction increases as the radial through-hole 56 extends from the outer circumferential surface to the inner circumferential surface, such that the inner circumferential surface of the radial through-hole 56 includes a sloped surface 62 on one of opposite sides of the center of the hole 56 which is near to an axial end face 60 of the fitting portion 14, as shown in FIG. 3. The sloped surface 62 is substantially parallel to the above-described sloped surface 48 of the clamp rod 48, but the inclination of the sloped surface 62 with respect to the axis of the tool holder 10 is larger than the inclination of the sloped surface 48 with respect to the axis of the clamp rod 44.

The reamer holder 10 further has an O-ring 64 fitted in the inner circumferential surface of the axial hole 52, and an annular-shaped engaging groove 70 formed in the outer circumferential surface in the body portion 12.

When the reamer holder 10 is not attached to the spindle 24, the clamp rod 44 is held in its forward end position so that the balls 40 are accommodated in the respective ball-accommodating recesses 46, and do not project radially outwardly from the respective radially-extending holes 38. For attaching the reamer holder 10 to the spindle 24, the fitting portion 14 of the reamer holder 10 is fitted into the spindle hole 26 by an operator, or by an arm of an automatic tool changing device which arm engages the above-described engaging groove 70, such that the radial through-holes 56 and the radially-extending holes 38 are in aligned phase with each other, and such that engaging protrusions (not shown) formed in the fitting member 30 are fitted in the engaging cutouts 54 formed in the fitting portion 14 so as to inhibit rotation of the reamer holder 10 relative to the spindle 24. Since the ball-accommodating recesses 46 of the clamp rod 44, the radially-extending holes 38 of the fitting member 30 and the radial through-holes 56 of the fitting portion 14 are brought in communication with each other, the balls 40 are displaceable into the respective radial through-holes 56.

Figure 2:
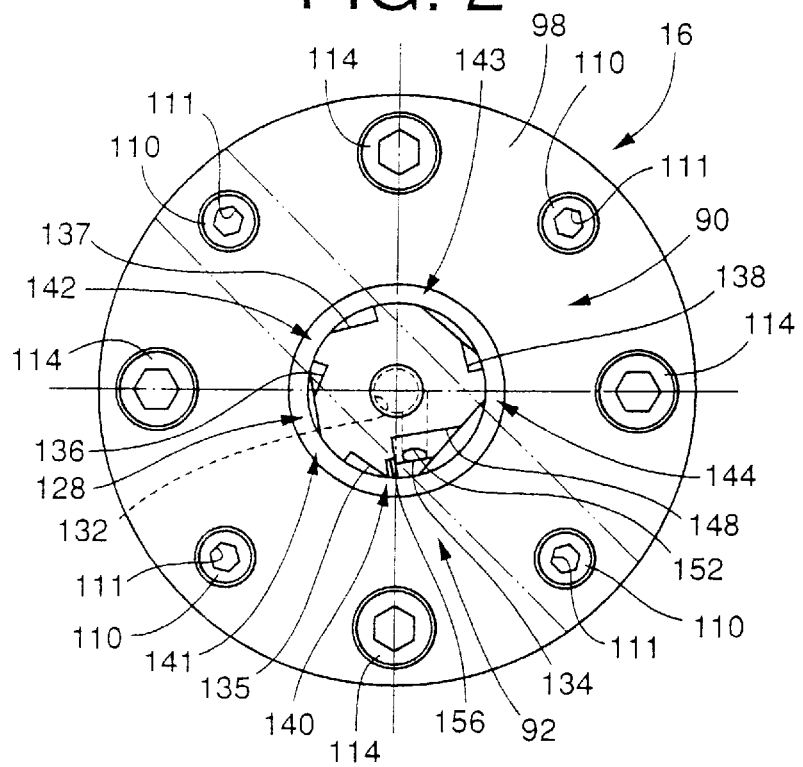
FIG. 2 is a left side view of the above-described reamer and reamer holder.

It is preferable that the reamer 16 is placed in a predetermined circumferential position relative to the spindle 24, as shown in FIG. 2, always when the reamer 16 is fixed relative to the spindle 24. A reference marking (not shown) is provided in each of the spindle 24, the reamer holder 10 and the reamer 16, for preventing the reamer holder 10 from being fixed to the spindle 24 with a relative circumferential position therebetween being shifted from a predetermined position by 180°, and for preventing the reamer 16 from being fixed to the reamer holder 10 with a relative circumferential position therebetween being shifted from a predetermined position by 90°, 180° or −90°.

With the ball-accommodating recesses 46, the radially-extending holes 38 and the radial through-holes 56 being held in communication with each other, as described above, when the clamp rod 44 is moved by the rod driving device toward its backward end position, the balls 40 are brought up to the sloped surfaces 48 of the clamp rod 44 and displaced through the radially-extending holes 38 into the radial through-holes 56 so as to be then forced to contact with the sloped surfaces 62 of the reamer holder 10. Thus, the sloped surfaces 62 are forced in the backward direction by the balls 40, whereby the reamer holder 10 is drawn into the spindle hole 26 until a shoulder face 76 of the reamer holder 10 is brought into abutting-contact with the end face 28 of the spindle 24. The tapered outer circumferential surface 20 of the fitting portion 14 is brought into contact with the tapered inner circumferential surface of the spindle hole 26, with the O-ring 64 being brought into contact with the distal end of the fitting member 30, so that the reamer holder 10 is fixed to the spindle 24.

For removing the reamer holder 10 from the spindle 24, the clamp rod 44 is advanced by the rod driving device until the distal end face of the clamp rod 44 is brought into abutting-contact with the bottom face of the axial hole 52 formed in the fitting portion 14 of the reamer holder 10. At that instant, the balls 40 are displaceable into the ball-accommodating recesses 46, thereby permitting the reamer holder 10 to be removed from the spindle 24.

Figure 4:
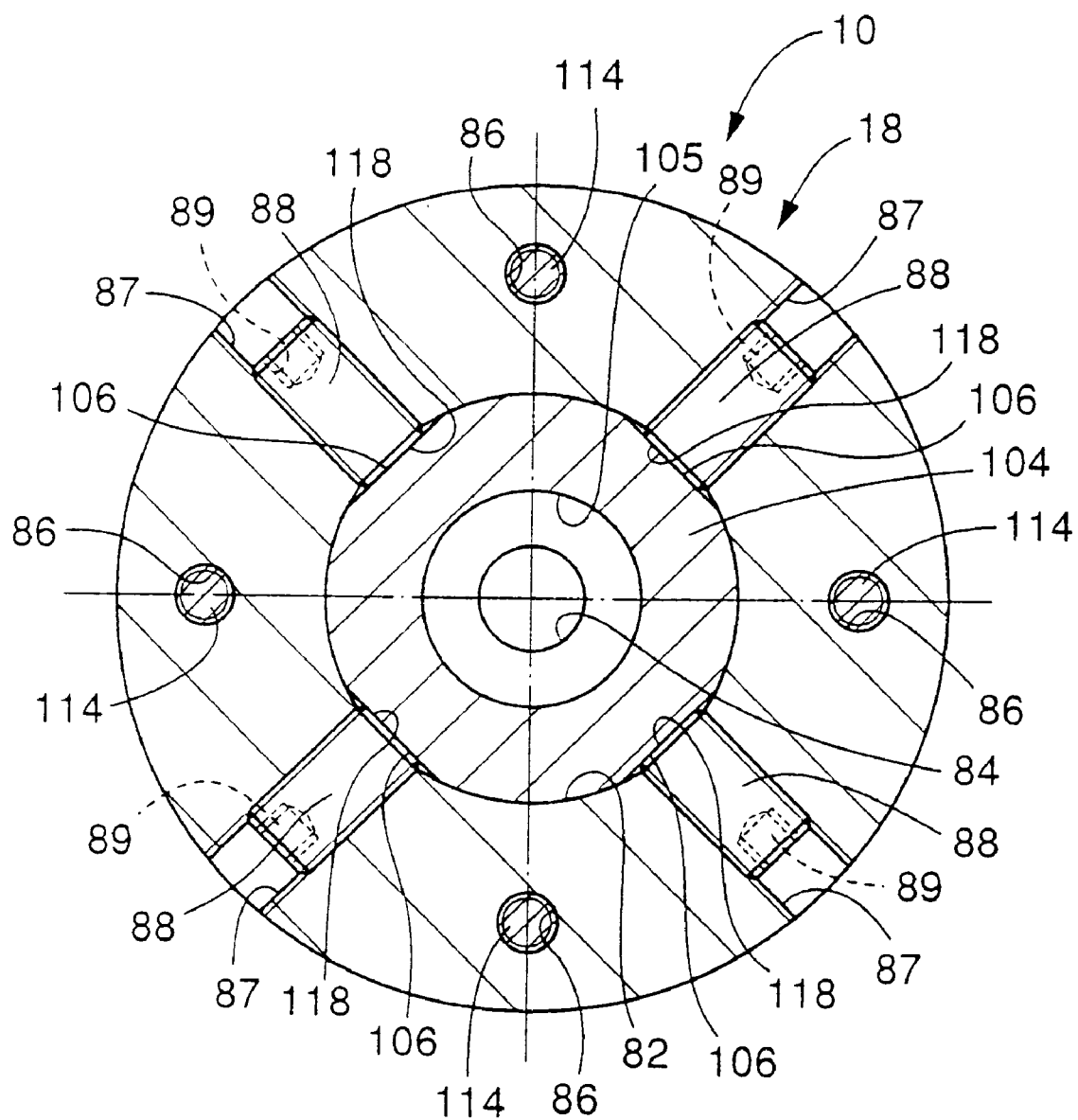
FIG. 4 is a cross sectional view taken along line A—A of FIG. 1.
Figure 5:
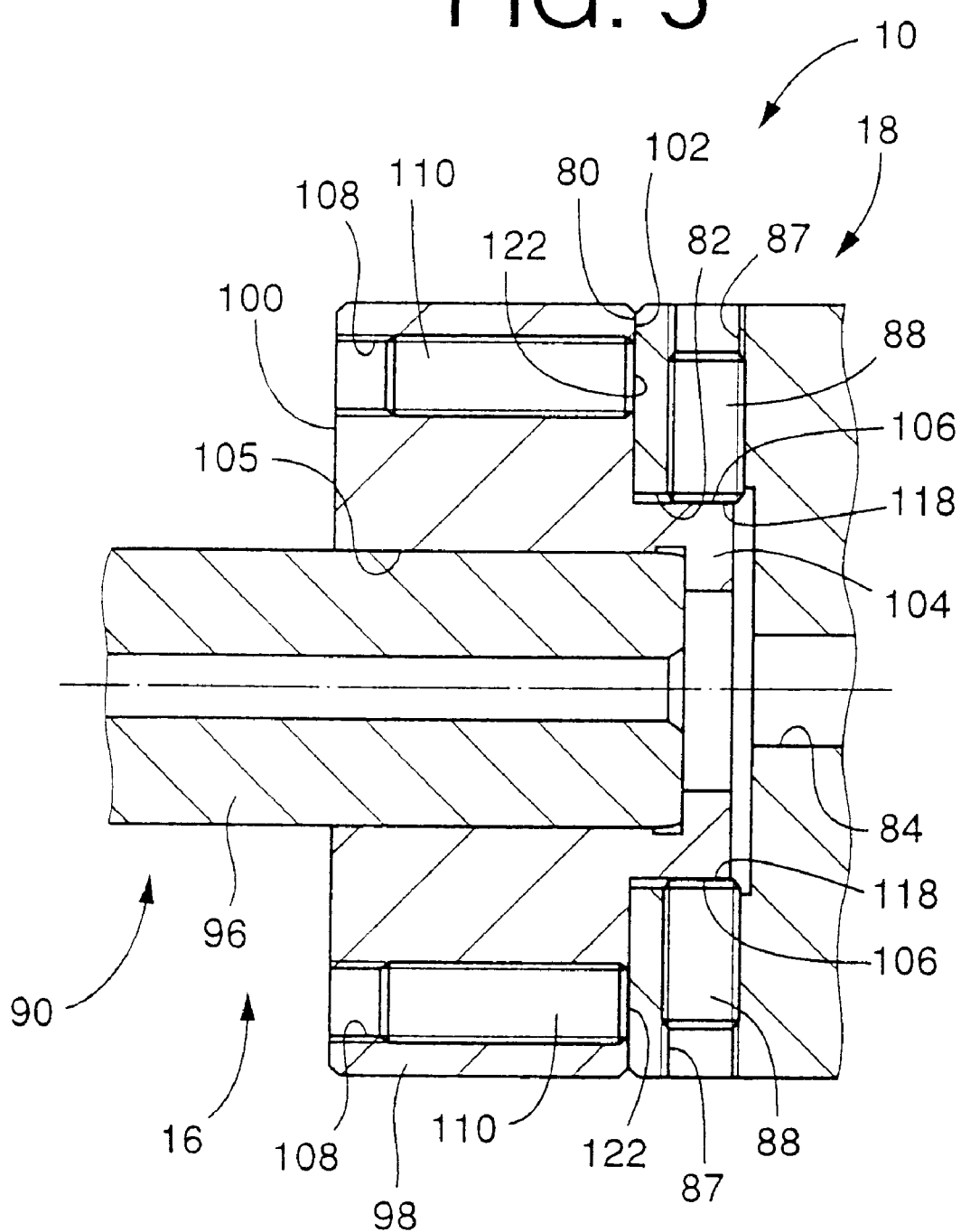
FIG. 5 is a front view in cross section showing essential parts of the above-described reamer and reamer holder.

As shown in FIGS. 4 and 5, the reamer holder 10 has a fitting hole 82 formed in an axial end face 80 thereof which is axially opposite to the above-described axial end face 60. The fitting hole 82 has a bottom face in which a coolant hole 84 opens. The coolant hole 84 extends in the axial direction and communicates with the above-described axial hole 52 formed in the fitting portion 14. The reamer holder 10 has four axially-extending tapped holes 86 formed in the axial end face 80, and four radially-extending tapped holes 87 in the outer circumferential surface of the holding portion 18. The four axially-extending tapped holes 86 are located around the fitting hole 82 and are equi-angularly spaced apart from each other in a circumferential direction of the reamer holder 10. The four radially-extending tapped holes 87 are formed through a circumferential wall which circumferentially defines the fitting hole 82 and which are equi-angularly spaced apart from each other in the circumferential direction. The four radially-extending tapped holes 87 are spaced apart from the axial end face 80 by a small distance in the axial direction, and each of the holes 87 is positioned between the circumferentially adjacent two of the axially-extending holes 86 in the circumferential direction. Into each of the radially-extending tapped holes 87, there is screwed a radially adjusting screw 88 which has a flat end and a hexagonal socket 89. By rotating the radially adjusting screw 88 by a suitable tool engaging with the hexagonal socket 89, the radially adjusting screw 88 can project inwardly from the inner circumferential surface of the fitting hole 82 over a suitable distance.

Into the fitting hole 82, the reamer 16 is fitted. The reamer 16 consists of a reamer main body 90 and a flange 98. The reamer main body 90 has a distal-end small-diameter portion 94 in its distal end portion, and a shank portion 96 in its proximal end portion. The distal-end small-diameter portion 94 includes a cutting blade portion 92. The flange 98 is fixed to the shank portion 96, and extends radially outwardly from the shank portion 96. The reamer main body 90 projects from one 100 of opposite end faces of the flange 98. A fitting boss 104 having a substantially circular end face is formed in the other end face 102 of the flange 98, and projects from the other end face 102 in the axial direction, so as to be fitted in the fitting hole 82 of the reamer holder 10. A stepped through-hole 105 is formed through the flange 98 and extends in the axial direction. The stepped through-hole 105 has a small diameter portion extending over a predetermined distance from the substantially circular end face of the fitting boss 104 toward the end face 100, and a large diameter portion extending from the small diameter portion to the end face 100. The reamer main body 90 and the flange 98 are formed independently of each other for easier manufacturing of the reamer. The shank portion 96 of the reamer main body 90 is introduced into the through-hole 105 until the shank portion 96 is brought into abutting-contact with a shoulder face defined by the large and small diameter portions of the through-hole 105, and the shank portion 96 is then shrinkage-fitted in the through-hole 105 so that the reamer main body 90 is integrated with the flange 98.

Figure 6:
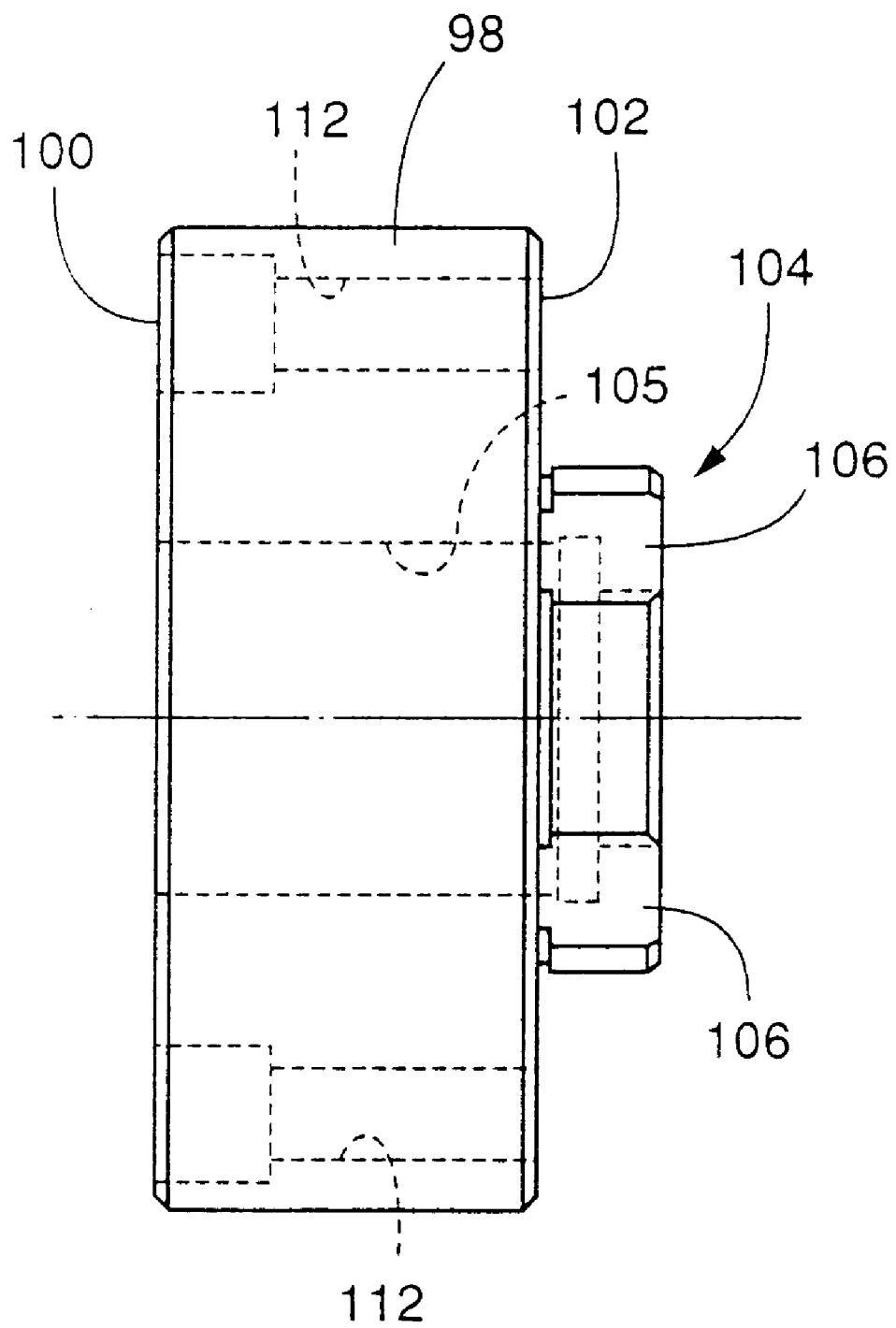
FIG. 6 is a front elevational view of a flange of the above-described reamer.
Figure 7:
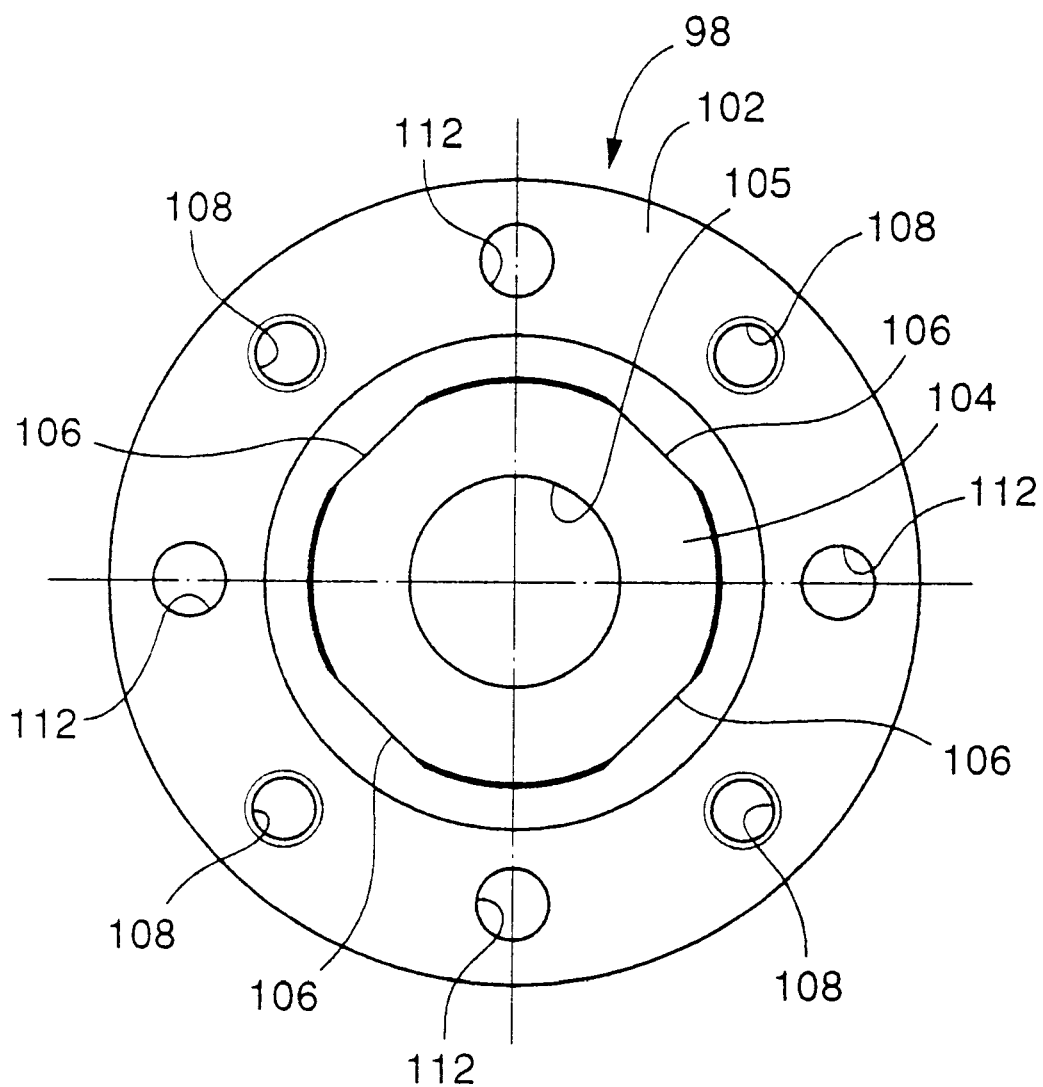
FIG. 7 is a right side view of the above-described flange.

In the outer circumferential surface of the fitting boss 104, four flat surfaces 106 are formed so as to be equi-angularly spaced apart from each other in the circumferential direction of the flange 98, as shown in FIGS. 6 and 7. The four flat surfaces 106 are obtained by cutting off the respective four portions of the outer circumferential surface each having an arcuate shape. The flange 98 further has four axially-extending tapped holes 108 arranged about the axis and equi-angularly spaced apart from each other in the circumferential direction. Each of the four axially-extending tapped holes 108 is located radially outside of the outer circumferential surface of the fitting boss 104, and is positioned in the same position as the corresponding one of the flat surfaces 106 in the circumferential direction. Into each axially-extending tapped hole 108, there is screwed an axially adjusting screw 110 which has a flat end and a hexagonal socket 111. By rotating the axially adjusting screw 110 by a suitable tool engaging with the hexagonal socket 111, the axially adjusting screw 110 can project axially from the end face 102 over a suitable distance. It is noted that the flange 98 further has four axially-extending through-holes 112 arranged about the axis and equi-angularly spaced apart from each other in the circumferential direction. Each of the four axially-extending through-holes 112 is located radially outside of the outer circumferential surface of the fitting boss 104, and is positioned between the circumferentially adjacent two of the axially-extending tapped holes 108 in the circumferential direction.

In attachment of the reamer 16 to the reamer holder 10, the fitting boss 104 of the flange 98 is first introduced into the fitting hole 82 of the reamer holder 10, such that the position of each axially-extending tapped hole 86 of the reamer holder 10 and the position of the corresponding axially-extending through-hole 112 of the flange 98 coincide with each other in the circumferential direction, and such that the position of each radially-extending tapped hole 87 of the reamer holder 10 and the position of the corresponding of the axially-extending tapped holes 108 of the flange 98 coincide with each other in the circumferential direction. The fitting boss 104 is introduced into the fitting hole 82 until the end face 102 of the flange 98 is brought into abutting-contact with the end face 80 of the reamer holder 10. Each radially adjusting screw 88 is then screwed into the corresponding radially-extending tapped hole 87 so that a top end face 118 of the radially adjusting screw 88 projects radially inwardly from the inner circumferential surface of the fitting hole 82, while each set screw bolt 114 passing through the corresponding axially-extending through-hole 112 is loosely screwed into the corresponding axially-extending tapped hole 86. The radially adjusting screw 88 is screwed into the radially-extending tapped hole 87 until the top end face 118 is brought into abutting-contact with the corresponding flat surface 106, as shown in FIG. 4. By adjusting a radial distance over which each radially adjusting screw 88 radially inwardly projects from the inner circumferential surface of the fitting hole 82, it is possible to minimize a radial deviation of the axis of the reamer 16 from the axis of the reamer holder 10. Further, each axially adjusting screw 110 is also screwed into the corresponding axially-extending tapped hole 108, so that a top end face 122 of the axially adjusting screw 110 projects from the end face 102 of the flange 98 and is brought into abutting-contact with the end face 80 of the reamer holder 10, as shown in FIG. 5. By adjusting an axial distance over which each axially adjusting screw 110 projects from the end face 102 of the flange 98, it is possible to minimize an inclination of the axis of the reamer 16 with respect to the axis of the reamer holder 10. Each set screw bolt 114 is firmly screwed into the corresponding axially-extending tapped hole 86, so that the reamer 16 and the reamer holder 10 are fixed to each other, with a high degree of coaxiality therebetween.

Figure 8A:
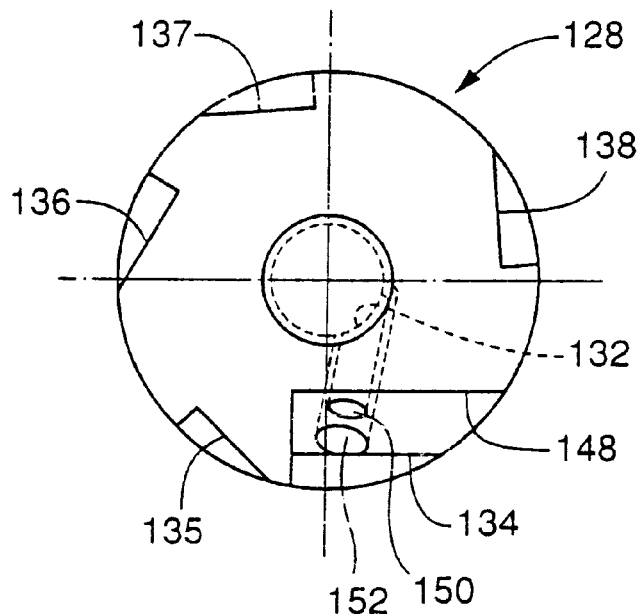
FIG. 8 is a view showing method of forming land surfaces in the above-described reamer.
Figure 8B:
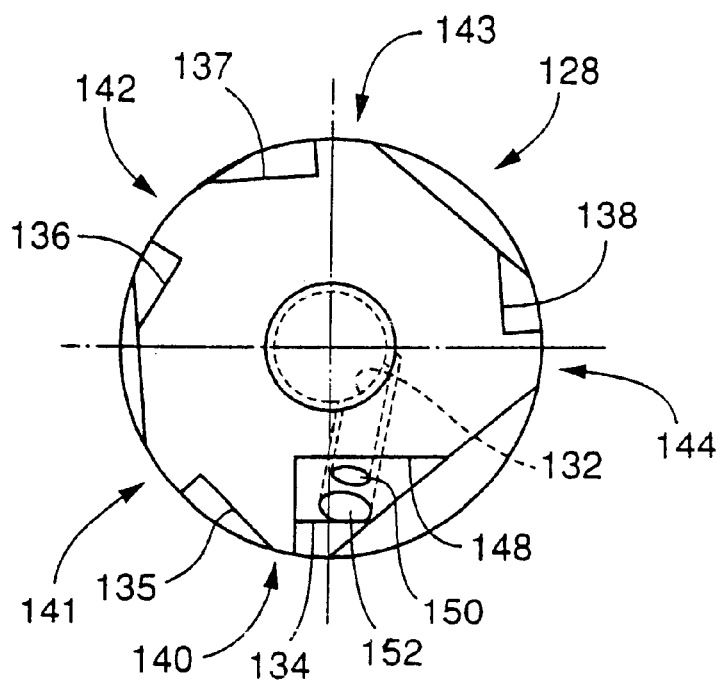

The reamer main body 90 has the above-described shank portion 96 and a body portion 128 extending from the shank portion 96 in the axial direction. The body portion 128 has the above-described distal-end small-diameter portion 94 which includes the cutting blade portion 92, and a guide portion 130 which is interposed between the distal-end small-diameter portion 94 and the shank portion 96 and which extends in the axial direction over an axial distance larger than the distal-end small-diameter portion 94. The reamer main body 90 has at its center a coolant hole 132 extending in the axial direction. This coolant hole 132 is brought in communication with the coolant hole 84 formed through the reamer holder 10, when the reamer 16 is attached to the reamer holder 10. In the outer circumferential surface of the body portion 128, flutes 134, 135, 136, 137, 138 are first formed so as to extend straight from the distal-end small-diameter portion 94 to the guide portion 130 in a direction parallel to the axis of the reamer 16, as shown in FIG. 8(a), and arcuate portions each including a part of the bottom surface of the corresponding one of the flutes 134, 136, 137, 138 are then cut off, as shown in FIG. 8(b), whereby a plurality of land surfaces 140, 141, 142, 143, 144 (five land surfaces in the present embodiment) are provided. The land surfaces 140, 141, 142, 143, 144 extend straight in the direction parallel to the axis of the reamer 16, as the flutes 134, 135, 136, 137, 138. It is noted that the flutes 134–138 are not equi-angularly spaced apart from each other, and accordingly the land surfaces 140–144 are not equi-angularly spaced apart from each other, either. The positions in which the respective land surfaces 140–144 are formed will be explained in later.

The body portion 128 further has a deep flute 148 in the distal-end small-diameter portion 94. This deep flute 148 is circumferentially contiguous to the land surface 140, and has a radial depth larger than that of the groove 134. In the bottom surface of the deep flute 148, two coolant holes 150, 152 open at respective positions which are spaced apart from each other in the axial direction. The coolant holes 150, 152 are inclined with respect to the axis such that the coolant holes 150, 152 become closer the axis as the coolant holes 150, 152 extend towards the rear end of the body portion 128. The coolant holes 150, 152 communicate with the coolant hole 132, so that a coolant which is supplied from a coolant supplying device (not shown) first passes through the coolant holes 50, 132 formed through the respective spindle 24 and reamer holder 10 and then spouts out of the coolant holes 150, 152.

Figure 9:
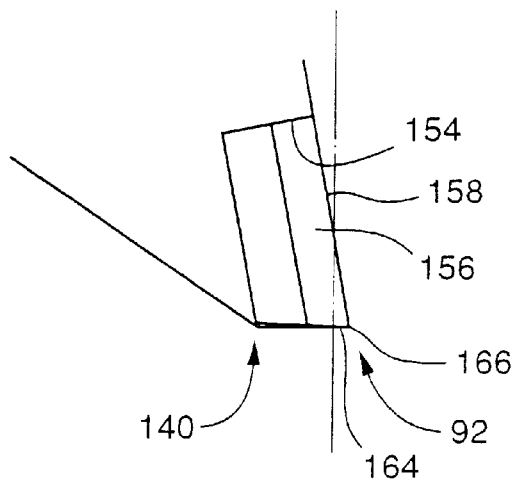
FIG. 9 is a view showing in enlargement a part of the above-described reamer in which a cutting tip is disposed.
Figure 10:
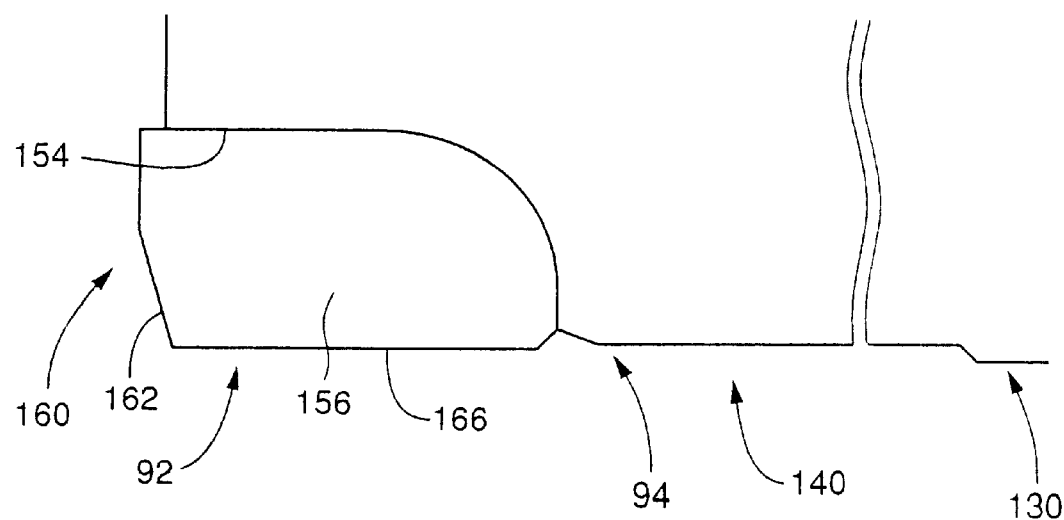
FIG. 10 is a front view showing in enlargement an essential part of the above-described reamer.

In one of widthwise opposite side surfaces of the flute 148 which is circumferentially contiguous to the land surface 140, a recess 154 is formed to serve as a cutting-tip seat. A cutting tip 156 is fitted in the recess 154, and is fixedly brazed to the recess 154, as shown in FIG. 9. The cutting tip 156 is formed of a diamond sintered body (including a diamond coating formed by sintering an artificial diamond at an ultra-high temperature and an ultra-high pressure, and a cemented carbide substrate covered by the diamond coating). The cutting tip 156 has an axially-projecting portion 160 serving as a leading portion, and projecting outwardly from the distal end face of the reamer main body 90 over a short distance in the axial direction, as shown in FIG. 10. The cutting tip 156 has a rake face 158 which is in the same surface as the side surface of the flute 148, and a margin 164 which circumferentially intersects the rake face 158. The cutting tip 156 has a major cutting edge 162 formed in the leading portion 160, and a minor cutting edge 166 formed by the intersection of the rake face 158 and the margin 164. The rake face 158, the major cutting edge 162, the margin 164 and the minor cutting edge 166 cooperate with each other to constitute the above-described cutting blade portion 92.

A radial distance from the axis of the reamer 16 to the minor cutting edge 166 (hereinafter referred to as a turning radius of the minor cutting edge 166) is larger than a radial distance from the axis to each of the land surfaces 140–144 (hereinafter referred to as a turning radius of each of the land surfaces 140–144) in the distal-end small-diameter portion 94. In the present embodiment, the minor cutting edge 166 is back-tapered, namely, extends in a direction which is slightly inclined with respect to the axis, such that the turning radius of the minor cutting edge 166 is progressively reduced in a direction away from the distal end of the reamer 16 toward the proximal end of the reamer 16 (toward the guide portion 130). However, the turning radius of the minor cutting edge 166 even at the rear end of the minor cutting edge 166 is still larger than the turning radius of each of the land surfaces 140–144 in the distal-end small-diameter portion 94. Further, in the present embodiment, each of the land surfaces 140–144 in the distal-end small-diameter portion 94 is also slightly back-tapered, namely, extends in a direction which is slightly inclined with respect to the axis.

As shown in FIG. 2, the land surfaces 140, 141, 142 are located in a first region while the land surface 144 is located in a second region, wherein the first region corresponds to one of opposite sides of an imaginary plane containing the axis of the reamer 16 and an intersection of the major and minor cutting edges 162, 166 on which side the land surface 140 is located, and wherein the second region corresponds to the other side of the imaginary plane. The land surface 143 is located in a position diametrically opposed to the land surface 140. An angular interval between each circumferentially adjacent two land surfaces in the first region is smaller than that in the second region. The land surfaces 141–144 have the substantially same width as measured in the circumferential direction, while the land surface 140 has a width smaller than that of each of the guide surfaces 141–144.

The turning radius of each of the land surfaces 140–144 in the guide portion 130 is larger than the turning radius of the minor cutting edge 166. Further, the turning radius of each of the land surfaces 140–144 in the guide portion 130 is larger than in the distal-end small-diameter portion 94. Thus, in each of the land surfaces 140–144, a shoulder face is provided between the distal-end small-diameter portion 94 and the guide portion 130, as exaggeratedly shown in FIG. 10. In the present embodiment, each of the land surfaces 140–144 in the guide portion 130 is also slightly back-tapered, namely, extends in a direction which is slightly inclined with respect to the axis, such that a diameter of the guide portion 130 is slightly smaller at its rear end which is adjacent to the shank portion 96 than at its forward end which is adjacent to the distal-end small-diameter portion 94. However, the turning radius of each of the land surfaces 140–144 even at the rear end of the guide portion 130 is still larger than the turning radius of the minor cutting edge 166. In the present embodiment, a maximum turning radius of each of the land surfaces 140–144 in the guide portion 130 (the turning radius at the rear end of the guide portion 130) is larger than a maximum turning radius of the minor cutting edge 166 (the turning radius in a portion of the minor cutting edge 166 which portion is adjacent to the major cutting edge 162) by 8 µm.

Figure 13:
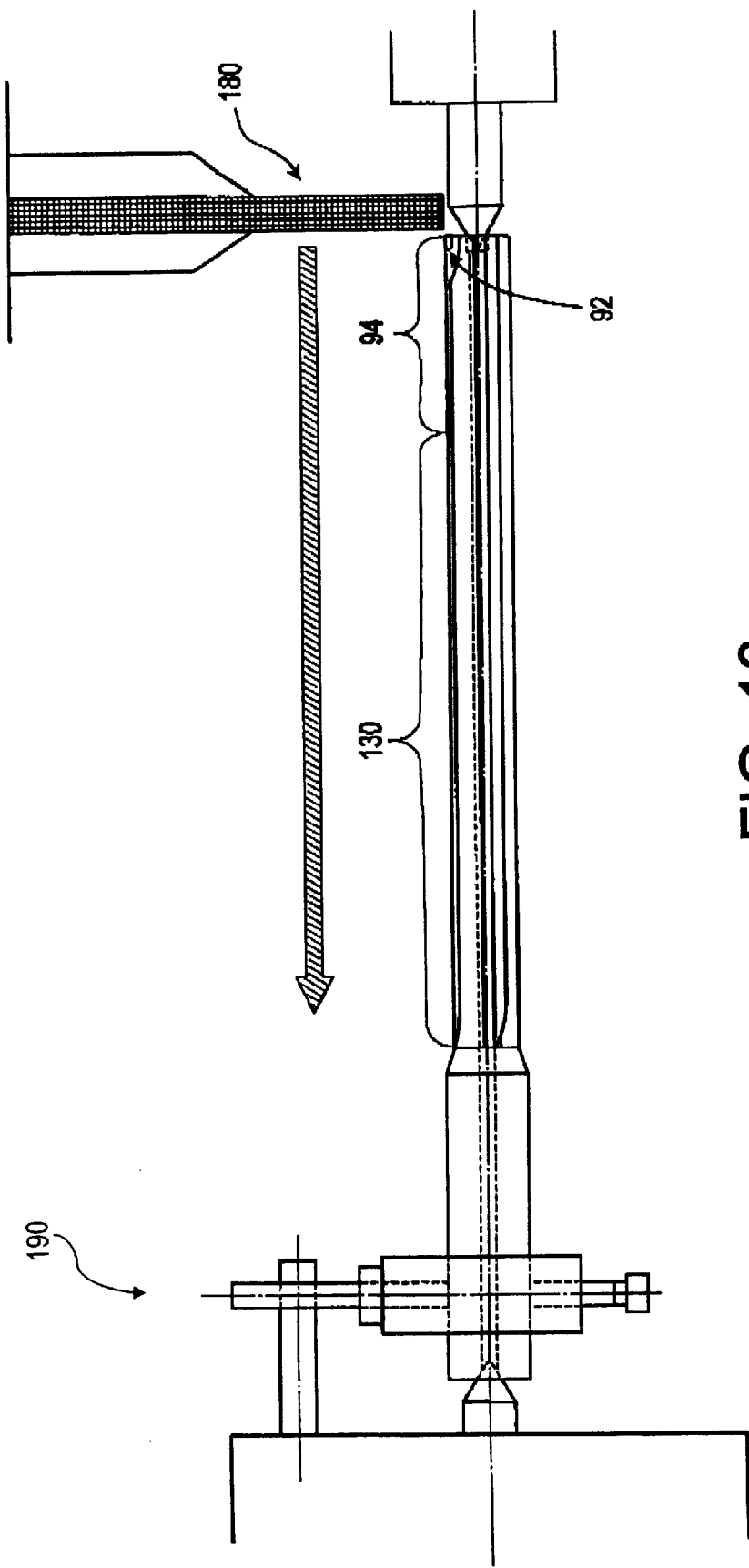
FIG. 13 is a view showing a reamer blank fixed relative to a machine tool by a chucking device.

When manufacturing the reamer 16, a reamer blank is fixed relative to a machine tool 180 by a chucking device 190, as shown in FIG. 13. The reamer blank is then machined into the reamer 16 such that at least the minor cutting edge 166 of the cutting blade portion 92 and at least one land surface 140–144 in the guide portion 130 are machined by the machine tool 180 in a single process without changing the positional relationship between the reamer blank and the chucking device 190. As such, the radial distance from an axis of the reamer 16 to the minor cutting edge 166 of the cutting blade portion 92 can be set to be smaller than a radial distance from the axis of the reamer 16 to the at least one land surface 140–144 in the guide portion 16 by a predetermined amount.

The reamer 16 constructed as described above is advantageously used for finishing a plurality of holes which are arranged along a line and spaced apart from each other in the axial direction of the holes. There will be described a case where inner circumferential surfaces of camshaft holes of a cylinder head 170 for a motor vehicle engine are finished by the reamer 16, with reference to FIG. 11, by way of an example.

Figure 11:
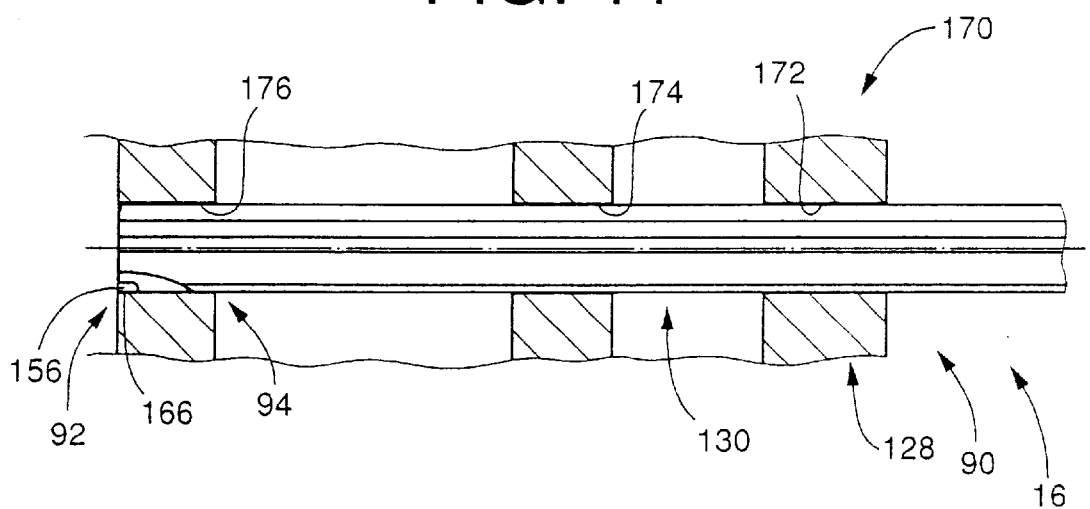
FIG. 11 is a front view (partially in cross section) showing a state in which an inner circumferential surface is being finished by the above-described reamer.

The cylinder head 170 has a main body and a plurality of bearing caps which are fixed in the respective positions in the main body. As schematically shown in FIG. 11, a plurality of camshaft holes are formed in the thus constructed cylinder head 170, so as to be arranged along a line and spaced apart from each other in the axial direction of the holes. Only three 172, 174, 176 of the camshaft holes are shown in FIG. 11. Since the construction of the cylinder head is publicly known, redundant descriptions thereof will not be provided.

For finishing the inner circumferential surfaces of the camshaft holes 172, 174, 176, the spindle 24 and the reamer 16 attached to the spindle 24 are advanced toward the cylinder head 170, while the spindle 24 and the reamer 16 are rotated relative to the cylinder head 170, so that the distal-end small-diameter portion 94 of the reamer 16 is first introduced from the outside of the cylinder head 170 into the camshaft hole 172, whereby the inner circumferential surface of the camshaft hole 172 is machined by a portion of the major cutting edge 162 and a portion of the minor cutting edge 166 which are contiguous to each other. During the machining, a cutting resistance acting on the major and minor cutting edges 162, 166 is supported by the inner surface of the camshaft hole 172 via the land surfaces 141, 142 located in the first region and the land surface 143 located diametrically opposed to the land surface 140, thereby preventing the reamer 16 from being deflected in a direction toward the first region. Further, the reamer 16 is prevented from being deflected also in a direction toward the second region, owing to the land surface 144 located in the second region. Thus, throughout the machining, the reamer 16 is rotated precisely about the axis, without run-out of the reamer 16. Further, a coolant (cutting fluid) is supplied through the coolant holes 150, 152, and the coolant serves to reduce a friction acting between the reamer 16 and the camshaft hole 172 and cool a heat generated by the friction.

After the camshaft hole 172 has been finished, the next hole, i.e., the camshaft hole 174 is finished by further advancement of the reamer 16. When the inner circumferential surface of the camshaft hole 174 is machined by reamer 16, the guide portion 130 of the reamer 16 is interference-fitted in the machined camshaft hole 172. That is, the center of the camshaft hole 174 and the axis of the reamer 16 are held coincident with each other while the camshaft hole 174 is being finished. In the present embodiment, the turning radius of the minor cutting edge 166 and the turning radius of the guide portion 130 are suitably determined such that the guide portion 130 is suitably interference-fitted in the finished camshaft hole. Amount of the interference fit is substantially equal to the difference (8 µm) between the turning radius of the minor cutting edge 166 and the turning radius of the guide portion 130. Further, since the reamer 16 is rotated relative to the camshaft hole 172 while the land surfaces 140–144 in the guide portion 130 are interference-fitted in the camshaft hole 172, the inner circumferential surface of the camshaft hole 172 is burnished by the land surfaces 140–144, whereby smoothness of the inner circumferential surface of the camshaft hole 172 is improved.

After the camshaft hole 174 has been finished, the distal-end small-diameter portion 94 of the reamer 16 is introduced into the camshaft hole 176 by further advancement of the reamer 16. While the camshaft hole 176 is machined, the land surfaces 140–144 in the guide portion 130 are interference-fitted in the camshaft holes 172, 174 which have been finished. Namely, the camshaft hole 176 is finished with the land surfaces 140–144 in the guide portion 130 being suitably guided at two points, which are spaced apart from each other in the axial direction, by the respective camshaft holes 172, 174. When all the camshaft holes are finished, the reamer 16 is retreated from the cylinder head 170.

In the present embodiment, the camshaft holes 174, 176 are machined with the guide portion 130 being interference-fitted in the machined camshaft hole or holes, i.e., with the guide portion 130 being suitably guided by the machined camshaft hole or holes, whereby the camshaft holes are finished with a high degree of concentricity between the camshaft holes and a high degree of dimensional accuracy of each camshaft hole are obtained. The finishing method or the reamer according to the present embodiment is advantageously employed in a case where a plurality of holes are to be finished with a high degree of concentricity between the holes and a high degree of dimensional accuracy of each hole.

Figure 12:
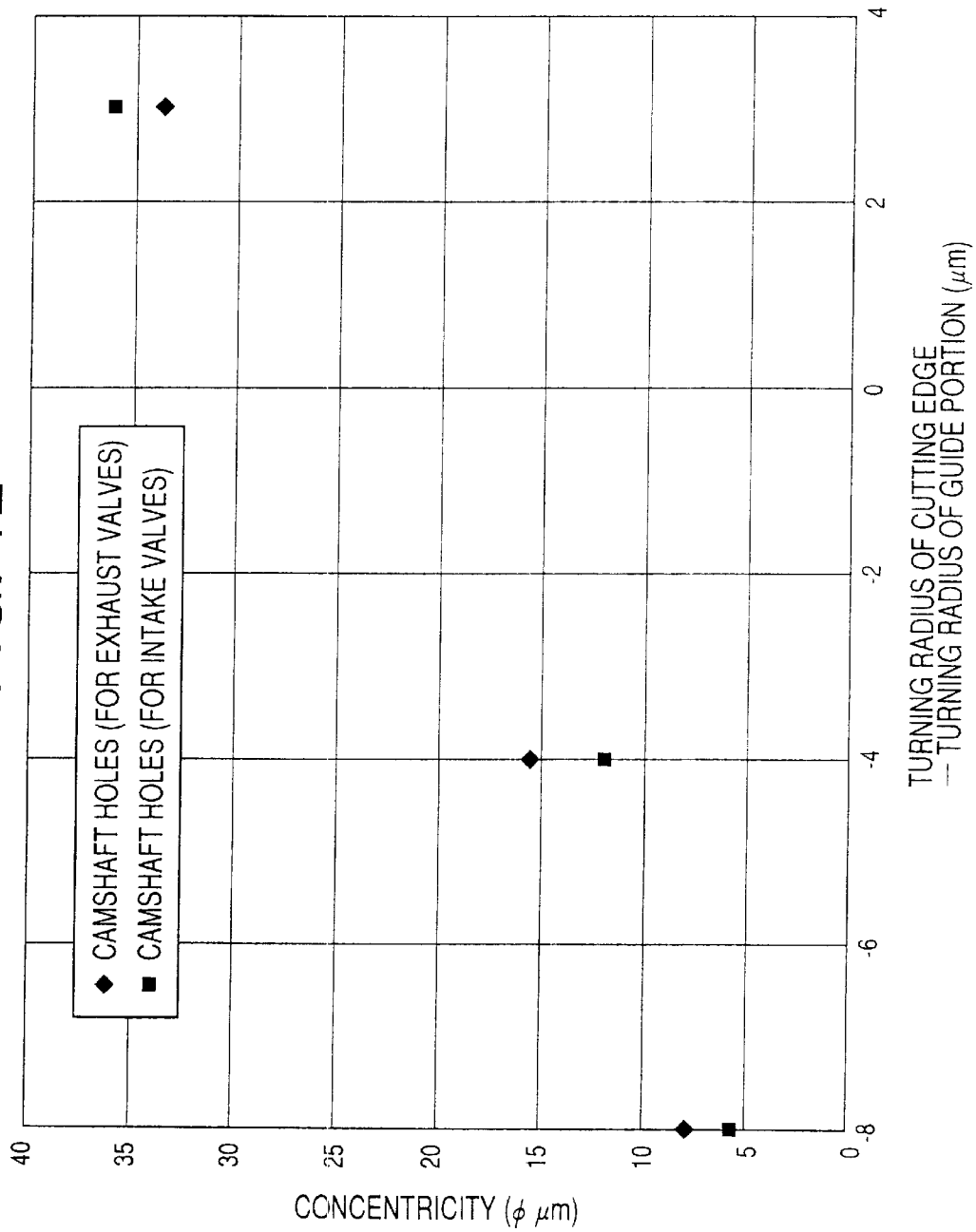
FIG. 12 is a graph showing a relationship between a degree of concentricity between a plurality of camshaft holes, and a difference between a turning radius of a minor cutting edge at its axially distal end and a turning radius of a guide portion.

As is clear from the result of a test shown in FIG. 12, a high degree of concentricity between the plurality of holes arranged in the axial direction is assured, by determining the turning radius of the guide portion 130 and the turning radius of the minor cutting edge 166 such that the turning radius of the guide portion 130 is larger than the turning radius of the minor cutting edge 166. In the test, camshaft holes for intake and exhaust valves in cylinder heads were finished, by three reamers having respective different values of the difference between the turning radius of the minor cutting edge and the turning radius of the guide portion. (Each of the values is obtained by subtracting the turning radius of the guide portion from the turning radius of the minor cutting edge.)

Two of the three reamers had negative values in the above-described difference, while the other one of the three reamers had a positive value in the above-described difference. After the camshaft holes for the intake and exhaust valves in each cylinder head had been finished by the corresponding one of the three reamers, the concentricity between the camshaft holes for the intake valves and the concentricity between the camshaft holes for the exhaust valves in each cylinder head were measured by using a publicly known measurement device. In the measurement of the concentricity, a straight line connecting between the centers of the two camshaft holes, which were located in the axially opposite ends, was first determined. And then, the largest and smallest radial distance from the straight line to the inner circumferential surfaces of holes, which were interposed between the two axially opposite end holes, were then obtained. The concentricity is defined as a difference between the largest and smallest radial distances. FIG. 12 shows the concentricity between the camshaft holes for the intake valves and the concentricity between the camshaft holes for the exhaust valves in each cylinder head, wherein the camshaft holes were finished by the corresponding one of the three reamers.

The test of FIG. 12 revealed that the reamer in which the turning radius of the guide portion is larger than the turning radius of the minor cutting edge provides a higher degree of concentricity of the camshaft holes, than the conventional reamer in which the turning radius of the minor cutting edge is larger than the turning radius of the guide portion. Further, the test also revealed that the degree of concentricity of the camshaft holes is further improved if the turning radius of the guide portion is larger than the turning radius of the minor cutting edge by 4 μm or more, and is still further improved if the turning radius of the guide portion is larger than the turning radius of the minor cutting edge by about 8 μm, as in the present embodiment.

While the embodiment of the present invention has been described above for illustrative purpose only, it is to be understood that the present invention is not limited to the details of the above-described embodiment but may be embodied with various changes, modifications and improvements, which may occur to those skilled in the art, without departing from the spirit and scope of the present invention defined in the claims.

What is claimed is:

1. A reamer comprising:
   (a) an axially-distal-end small-diameter portion which extends over a predetermined axial distance from an axially distal end of said reamer toward an axially proximal end of said reamer;
   (b) a guide portion which is axially adjacent to said axially-distal-end small-diameter portion and which has a diameter larger than that of said axially-distal-end small-diameter portion;
   (c) at least one flute which is formed in an outer circumferential surface of said reamer and which extends from said axially distal end of said reamer toward said axially proximal end of said reamer; and
   (d) at least one land surface each of which is adjacent, in a circumferential direction of said reamer, to the corresponding one of said at least one flute and which constitutes said outer circumferential surface of said reamer, at least one of said at least one land surface having a cutting blade portion formed therein in said axially-distal-end small-diameter portion,
   and wherein a first radial distance from an axis of said reamer to a radially outer end of said cutting blade portion is larger than a second radial distance from said axis to said at least one land surface in said axially-distal-end small-diameter portion by a predetermined first difference amount, and wherein said first radial distance is smaller than a third radial distance from said axis to said at least one land surface in said guide portion by a predetermined second difference amount.

2. A reamer according to claim 1, wherein said cutting blade portion is constituted by a cutting tip which is fixed to an axially distal end of said axially-distal-end small-diameter portion, said cutting tip being a sintered body having a hardness higher than that of cemented carbide.

3. A reamer according to claim 1, wherein said cutting blade portion has a cutting edge which is formed at said radially outer end of said cutting blade portion, and which extends in a direction slightly inclined with respect to said axis of said reamer, such that said first radial distance is progressively reduced in a direction away from said axially distal end of said reamer toward said axially proximal end of said reamer, and wherein said first radial distance is smaller than said third radial distance, even at an axially distal end of said cutting blade portion.

4. A reamer according to claim 1, wherein said guide portion is slightly tapered, such that said third radial distance is progressively reduced in a direction away from said axially distal end of said reamer toward said axially proximal end of said reamer, and wherein said third radial distance is larger than said first radial distance, even at one of axially opposite ends of said guide portion which is remote from said axially-distal-end small-diameter portion.

5. A reamer according to claim 1, wherein said at least one flute includes a plurality of flutes which are located about said axis and angularly spaced apart from each other, so that said at least one land surface includes a plurality of land surfaces which are located about said axis and angularly spaced apart from each other, and wherein at least one of said plurality of land surfaces is substantially opposed, diametrically of said reamer, to said at least one land surface having said cutting blade portion formed therein.

6. A reamer according to claim 1, in combination with a reamer holder which holds said axially proximal end of said reamer and which is to be mounted in a spindle of a machine tool, so that said reamer is fixed relative to said spindle; and
   an alignment mechanism which is provided between said reamer and said reamer holder and which decreases at least one of a radial deviation of said axis of said reamer from an axis of said reamer holder and an inclination of said axis of said reamer with respect to said axis of said reamer holder.

7. A reamer according to claim 6, wherein said reamer further includes a flange which is attached to said axially proximal end of said reamer and projects radially outwardly from said axially proximal end of said reamer, and which has at least three axially-extending tapped holes arranged about said axis of said reamer and angularly spaced apart from each other in a circumferential direction of said reamer, and at least three axially-extending through-holes arranged about said axis of said reamer and angularly spaced apart from each other in said circumferential direction, and wherein said alignment mechanism includes the same number of axially adjusting screws as that of said axially-extending tapped holes and the same number of set screw bolts as that of said axially-extending through-holes, said axially adjusting screws being screwed into said axially-extending tapped holes so as to be abuttable on an end face of said reamer holder, said set screw bolts being introduced into said axially-extending through-holes and then screwed into respective axially-extending tapped holes formed in said end face of said reamer holder, whereby said flange and said axially adjusting screws are forced by said set screw bolts to said end face of said reamer holder.

8. A reamer according to claim 6, wherein said reamer has a fitting boss formed in said axially proximal end of said reamer while said reamer holder has a fitting hole formed in an end face of said reamer holder so that said reamer and said reamer holder are connected with each other by axial engagement of said fitting boss and said fitting hole with each other, said reamer holder having at least three radially-extending tapped holes which are formed through a circumferential wall thereof circumferentially defining said fitting hole and which are angularly spaced apart from each other in a circumferential direction of said reamer holder, and wherein said alignment mechanism includes the same number of radially adjusting screws as that of said radially-extending tapped holes, said radially adjusting screws being screwed into said radially-extending tapped holes so as to be abuttable on an outer circumferential surface of said fitting boss.

9. A method of using the reamer of claim 1 to finish a plurality of holes which have been formed in a workpiece, said holes being arranged along a line and spaced apart from each other in an axial direction of said holes, said method comprising:

a step of moving said reamer and said workpiece relative to each other in said axial direction of said holes while rotating said reamer and said workpiece relative to each other, so that an inner circumferential surface of the first one of said holes is cut by said cutting blade portion of said reamer; and a step of further moving said reamer and said workpiece relative to each other in said axial direction of said holes while rotating said reamer and said workpiece relative to each other, so that an inner circumferential surface of a second one of said holes which is adjacent to said first one is cut by said cutting blade portion while said at least one land surface in said guide portion is fitted in said first one of said holes whose inner circumferential surface has been cut by said cutting blade portion.

10. A method according to claim 9, wherein said plurality of holes consist of at least three holes, said method further comprising:

a step of cutting an inner circumferential surface of one of said plurality of holes by said cutting blade portion of said reamer, with said at least one land surface in said guide portion being fitted in at least two of said plurality of holes whose inner circumferential surfaces have been cut by said cutting blade portion.

11. A method of manufacturing the reamer of claim 1, comprising:

a step of machining a reamer blank into said reamer on a machine tool, such that at least said radially outer end of said cutting blade portion and said at least one land surface in said guide portion are machined in a single process, without changing a positional relationship between said reamer blank and a chucking device by which said reamer blank is fixed relative to said machine tool, during said single process, so as to assure said predetermined second difference amount.

12. A reamer according to claim 1, wherein said predetermined second difference amount is not smaller than 4 $\mu$m.

13. A reamer according to claim 1, wherein said second radial distance is constant in said circumferential direction of said reamer, and wherein said third radial distance is constant in said circumferential direction.

14. A reamer according to claim 1, wherein said cutting blade portion has a major cutting edge which is formed at an axially distal end of said cutting blade portion, and a minor cutting edge which is formed at said radially outer end of said cutting blade portion and which intersects said major cutting edge.

15. A reamer according to claim 14, wherein said at least one flute includes a plurality of flutes which are located about said axis and angularly spaced apart from each other, so that said at least one land surface includes a plurality of land surfaces which are located about said axis and angularly spaced apart from each other, and wherein an angular interval between each circumferentially adjacent two of said plurality of land surfaces in a first region is smaller than that in a second region, said first region corresponding to one of opposite sides of a plane containing said axis and an intersection of said major and minor cutting edges on which side said at least one land surface having said cutting blade portion formed therein is located, said second region corresponding to the other side of said plane.

16. A reamer according to claim 1, wherein said predetermined second difference amount is not larger than 30 $\mu$m.

* * * * *